US009363955B2

(12) United States Patent
DeSantis

(10) Patent No.: US 9,363,955 B2
(45) Date of Patent: Jun. 14, 2016

(54) TREE REMOVAL DEVICE

(71) Applicant: Michael DeSantis, Cooper City, FL (US)

(72) Inventor: Michael DeSantis, Cooper City, FL (US)

( * ) Notice: Subject to any disclaimer, the term of this patent is extended or adjusted under 35 U.S.C. 154(b) by 0 days.

(21) Appl. No.: 14/542,282

(22) Filed: Nov. 14, 2014

(65) Prior Publication Data

US 2015/0351331 A1    Dec. 10, 2015

Related U.S. Application Data

(60) Provisional application No. 62/009,976, filed on Jun. 10, 2014.

(51) Int. Cl.
| *A01G 23/04* | (2006.01) |
| *A01G 23/06* | (2006.01) |
| *E02F 3/96* | (2006.01) |
| *E02F 3/34* | (2006.01) |

(52) U.S. Cl.
CPC ............ *A01G 23/043* (2013.01); *A01G 23/06* (2013.01); *A01G 23/062* (2013.01); *E02F 3/3414* (2013.01); *E02F 3/96* (2013.01)

(58) Field of Classification Search
CPC ...................................................... A01G 23/06
USPC ........................................ 144/195.1; 37/302
See application file for complete search history.

(56) References Cited

U.S. PATENT DOCUMENTS

| 2,734,290 | A | * | 2/1956 | Tuttle | ..................... | A01B 43/00 |
| | | | | | | 172/448 |
| 2,895,236 | A | * | 7/1959 | Pilch | ..................... | A01G 23/06 |
| | | | | | | 144/34.1 |
| 2,934,109 | A | | 4/1960 | Bles | | |
| 3,842,871 | A | * | 10/1974 | Jureiwicz | ................. | B27L 7/00 |
| | | | | | | 155/195.1 |
| 4,682,638 | A | * | 7/1987 | Becker | ................... | A01G 23/06 |
| | | | | | | 144/24.12 |
| 6,439,279 | B1 | * | 8/2002 | Underwood | ......... | A01G 23/091 |
| | | | | | | 144/336 |
| 6,764,139 | B1 | | 7/2004 | Wortman | | |
| 7,520,306 | B1 | | 4/2009 | Berge | | |
| 7,524,158 | B2 | * | 4/2009 | Eckstein | ............... | E02F 3/3627 |
| | | | | | | 37/468 |
| 7,610,698 | B2 | * | 11/2009 | May | ..................... | A01G 23/062 |
| | | | | | | 144/24.12 |
| 2009/0101234 | A1 | * | 4/2009 | Hart | ..................... | A01G 23/067 |
| | | | | | | 144/24.12 |
| 2011/0107623 | A1 | | 5/2011 | Neidlein | | |

* cited by examiner

*Primary Examiner* — John G Weiss
(74) *Attorney, Agent, or Firm* — Miller Law Group, PLLC

(57) ABSTRACT

A combination of a tree removal device and working vehicle for coupling the device thereon such that the combination is arranged for slicing tree roots. The working vehicle has a front element which is pivotable relative to a frame of the vehicle about a lateral axis in front of a forward end of the frame. The tree removal device includes an attachment portion for coupling to the front element and a knife element having a blade portion. The blade portion has front and rear edges arranged for engaging the ground in respective forward and backward directions of movement of the vehicle which are sharpened so as to perform a cutting action in the respective direction of movement when the blade portion engages the ground. Furthermore, the knife element is pivotable relative to the attachment about an axis in a vertical plane that divides the vehicle into symmetrical halves.

20 Claims, 5 Drawing Sheets

TREE REMOVAL DEVICE

CROSS-REFERENCE TO RELATED APPLICATIONS

This application claims domestic priority on U.S. Provisional Patent Application Ser. No. 62/009,976, filed Jun. 10, 2014, the content of which is incorporated herein by reference.

FIELD OF THE INVENTION

The present invention relates to a combination of a tree removal device and a working vehicle for coupling the tree removal device thereon, the working vehicle of the type having a front element that is pivotable relative to a frame of the vehicle about a lateral axis in front of a forward end of the frame and the tree removal device of the type having an attachment for mounting onto the working vehicle and a knife element which is arranged to engage the ground and perform cutting actions to slice tree roots, and more particularly the present invention relates to a combination of a tree removal device and working vehicle for coupling the tree removal device thereon, in which the knife element has front and rear edges arranged for engaging the ground which are sharpened so as to perform a cutting action in both forward and backward directions of movement of the working vehicle; and the knife element is arranged to be pivotally tilted laterally between extreme left and extreme right positions.

BACKGROUND

The disclosed invention is a combination of a tree removal device and a working vehicle for coupling the device thereon, in which the combination is used for slicing tree roots. Businesses involved in growing and breeding trees require the ability to transplant these trees for several reasons, which include moving a tree to a location with more favourable growing conditions or moving a tree because it has outgrown its current space. In a tree nursery setting, the arrangement of the trees makes transplantation especially problematic and difficult due to the relatively close spacing of the trees, which is in the range of eight to ten feet. The need to replant the tree after removing it from its current location requires that neither the tree trunk, branches, nor root ball are damaged during the removal process. The root ball is a conglomerate of the tree roots and soil between the roots.

Prior art examples describing tree removal devices that could be used to slice tree roots, especially in a tree nursery setting, include U.S. Pat. No. 7,520,306 to Berge; U.S. Pat. No. 2,934,109 to Bles; U.S. Pat. No. 6,764,139 given to Wortman; and U.S. Patent Publication No. 2011/0107623 to Neidlein. However, the tree removal devices described by these patents have some drawbacks. Firstly, the prior patents do not remove trees in such a manner that preserves same for transplantation. The patent given to Berge describes a tree knife tool used on a skid steer, which has serrated edges to cut roots and a tip that may be used to topple trees. While the serrated edges are able to cut tree roots, this cutting action destroys the roots. Furthermore, toppling the tree after cuttings its roots, which is the intended function of the tree knife tip, could potentially damage the branches and trunk of the tree. As such, the structure of Berge's tree knife is not intended to cut tree roots and remove trees so that the trees may be replanted. In addition, Wortman's patent describes a demolition implement with a hook that can be used to cut or pull out roots; however, doing so would destroy these roots. Secondly, the size of the devices described by some of the prior patents is too large to be used in a tree nursery setting without damaging tree trunks or branches. The patent given to Bles and the patent application for Neidlein describe inventions that rely on a vertical swinging motion to facilitate the cutting action of the devices. Such a swinging motion is not well suited to a tree nursery setting, where trees are spaced closely together and the need to avoid damaging trees may interfere with the swinging action that is the principle of operation of these devices.

SUMMARY OF THE INVENTION

According to one aspect of the invention there is provided a combination of a tree removal device and a working vehicle configured for coupling the tree removal device thereon such that the combination is arranged for slicing tree roots. The working vehicle has a frame with a forward end along a longitudinal axis of the vehicle, laterally opposing traction components coupled to respective lateral sides of the frame and configured to move the vehicle in forward and backward directions, and a front element pivotably coupled at a forward-most end of the working vehicle such that the front element is arranged for pivotal motion relative to the working vehicle about a lateral axis in front of the forward end of the frame. Further, the combination comprises an attachment configured for coupling in fixed relation to the front element and a knife element having opposite blade and support portions, the support portion being coupled to the attachment such that the knife element extends generally forwards from the attachment and is arranged to be pivotable relative to the frame of the working vehicle about the lateral axis in front of the forward end of the frame. The blade portion has a front edge arranged for engaging the ground in the forward direction of movement of the working vehicle and a rear edge arranged for engaging the ground in the backward direction of movement of the working vehicle, wherein the front and rear edges are sharpened so as to perform a cutting action in the respective forward and backward directions of movement of the working vehicle.

The present invention provides a means of removing trees in such a manner that preserves them for transplantation because having sharpened those edges of the blade portion which engage the ground allows the cutting actions in both the forward and backward directions of movement of the working vehicle to facilitate a slice at a single location along the root, even if slicing a single root requires several forward and backward motions. As such, the cutting actions allow a root ball of the tree to be preserved.

Preferably, the blade portion of the knife element further comprises a top edge arranged for engaging the ground in the forward direction of movement of the working vehicle such that the top edge meets the front edge at an upper end thereof so as to form a forward-most tip at the forward-most end of the blade portion of the knife element when the blade portion is pivotally rotated for engaging the ground, the top edge being sharpened so as to perform a cutting action in conjunction with the front edge in the forward direction of movement.

Preferably, the blade portion of the knife element further comprises a bottommost edge arranged for engaging the ground in the backward direction of movement of the working vehicle such that the bottommost edge meets the rear edge at a lower end thereof so as to form a rear tip at the rearward-most end of the blade portion of the knife element when the blade portion is pivotally rotated for engaging the ground, the bottommost edge being sharpened so as to perform a cutting action in conjunction with the rear edge in the backward direction of movement. In some instances, the bottommost edge meets the front edge at a lower end thereof so as to form a bottom tip at the downward-most end of the blade portion of the knife element when the blade portion is pivotally rotated for engaging the ground such that the bottom tip is arranged for digging the ground in both the forward and backward directions of movement of the working vehicle.

The knife element may also be arranged for pivotal motion about the longitudinal axis of the working vehicle relative to the attachment about an axis in a vertical plane containing the longitudinal axis of the working vehicle such that the vertical plane divides the working vehicle into symmetrical halves, the knife element being pivotable between an extreme left position and an extreme right position. The combination further comprises a mechanical actuator arranged for providing the pivotal motion of the knife element between the extreme left position and the extreme right position.

It is preferred that the combination further comprises a support post arranged for coupling the support portion of the knife element to the attachment, and the attachment comprises an attachment frame having opposite top and bottom cross members and two laterally opposed side members spanning between the top and bottom cross members, the support post being coupled to the attachment frame so that the support post extends in a general upward direction from the bottom cross member. Preferably, the support post comprises a pair of plates spaced laterally about a center axis of the support post arranged for coupling the support portion of the knife element therein. the support post is arranged for pivotal motion about the longitudinal axis of the working vehicle relative to the attachment about an axis in a vertical plane containing the longitudinal axis of the working vehicle such that the vertical plane divides the working vehicle into symmetrical halves, the support post being pivotable between an extreme left position and an extreme right position. Preferably, the combination further comprises a mechanical actuator arranged for providing the pivotal motion of the support post between the extreme left position and the extreme right position.

According to a second aspect of the invention there is provided a combination of a tree removal device and a working vehicle configured for coupling the tree removal device thereon such that the combination is arranged for slicing tree roots. The combination includes a working vehicle having a frame with a forward end along a longitudinal axis of the vehicle, laterally opposing traction components coupled to respective lateral sides of the frame and configured to move the vehicle in forward and backward directions, and a front element pivotably coupled at a forward-most end of the working vehicle such that the front element is arranged for pivotal motion relative to the working vehicle about a lateral axis in front of the forward end of the frame. Further, the combination comprises an attachment configured for coupling in fixed relation to the front element and a knife element having opposite blade and support portions, the support portion being coupled to the attachment such that the knife element extends generally forwards from the attachment and is arranged to be pivotable relative to the frame of the working vehicle about the lateral axis in front of the forward end of the frame, and the blade portion comprising at least one edge that is arranged to engage the ground in a respective at least one direction of movement of the working vehicle The combination also comprises a mechanical actuator arranged for coupling between the knife element and the attachment. Furthermore, the at least one edge is sharpened so as to perform a cutting action in the at least one direction of movement. Also, the knife element is arranged for pivotal motion relative to the attachment about an axis in a vertical plane containing the longitudinal axis of the working vehicle such that the vertical plane divides the working vehicle into symmetrical halves, the knife element being pivotable between an extreme left position and an extreme right position. Lastly, the mechanical actuator is arranged to provide the pivotal motion of the knife element between the extreme left position and the extreme right position.

The invention according to the second aspect describes a device that is able to avoid damaging the trunk and branches of the tree by providing a means of lateral adjustment of the knife element between two extreme positions. Tilting the knife element away from the center of the device permits the tree removal device to be used to slice the roots of trees whose trunks do not necessarily grow vertically, so as to prevent engagement of the tree trunk during a cutting action.

Preferably, the at least one edge of the blade portion is a front edge arranged for engaging the ground in the forward direction of movement of the working vehicle, the front edge being sharpened so as to perform the cutting action in the forward direction of movement of the working vehicle. It is preferred that the blade portion of the knife element further comprises a top edge arranged for engaging the ground in the forward direction of movement of the working vehicle such that the top edge meets the front edge at an upper end thereof so as to form a front tip at a forward-most end of the blade portion of the knife element when the blade portion is pivotally rotated for engaging the ground, the top edge being sharpened so as to perform the cutting action in conjunction with the front edge in the forward direction of movement.

Alternatively, it is preferred that the at least one edge of the blade portion is a rear edge arranged for engaging the ground in the backward direction of movement of the working vehicle, the rear edge being sharpened so as to perform the cutting action in the backward direction of movement of the working vehicle. Preferably, the blade portion of the knife element further comprises a bottommost edge arranged for engaging the ground in the backward direction of movement of the working vehicle such that the bottommost edge meets the rear edge at a lower end of the rear edge so as to form a rear tip at a rearward-most end of the blade portion of the knife element when the blade portion is pivotally rotated for engaging the ground, the bottommost edge being sharpened so as to perform the cutting action in conjunction with the rear edge in the backward direction of movement. In some instances, the blade portion of the knife element further comprises a front edge arranged for engaging the ground in the forward direction of movement of the working vehicle, and the bottommost edge meets the front edge at a lower end thereof so as to form a bottom tip at a downward-most end of the blade portion of the knife element when the blade portion is pivotally rotated for engaging the ground such that the bottom tip is arranged for digging the ground in both the forward and backward directions of movement of the working vehicle.

Preferably, the combination further comprises a support post arranged for coupling the support portion of the knife element to the attachment. The support post is arranged for pivotal motion about the longitudinal axis of the working vehicle relative to the attachment about the axis in the vertical plane containing the longitudinal axis of the working vehicle such that the vertical plane divides the working vehicle into symmetrical halves. The support post is pivotable between the extreme left position and the extreme right position in conjunction with the knife element when the support portion of the knife element is coupled in fixed relation to the support post. Furthermore, the attachment comprises an attachment frame having opposite top and bottom cross members and two laterally opposed side members spanning between the top and bottom cross members. The support post is coupled to the attachment frame so that the support post extends in a general upward direction from the bottom cross member. It is preferred that the support post comprises a pair of plates spaced laterally about a center axis of the support post arranged for coupling the support portion of the knife element therein.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
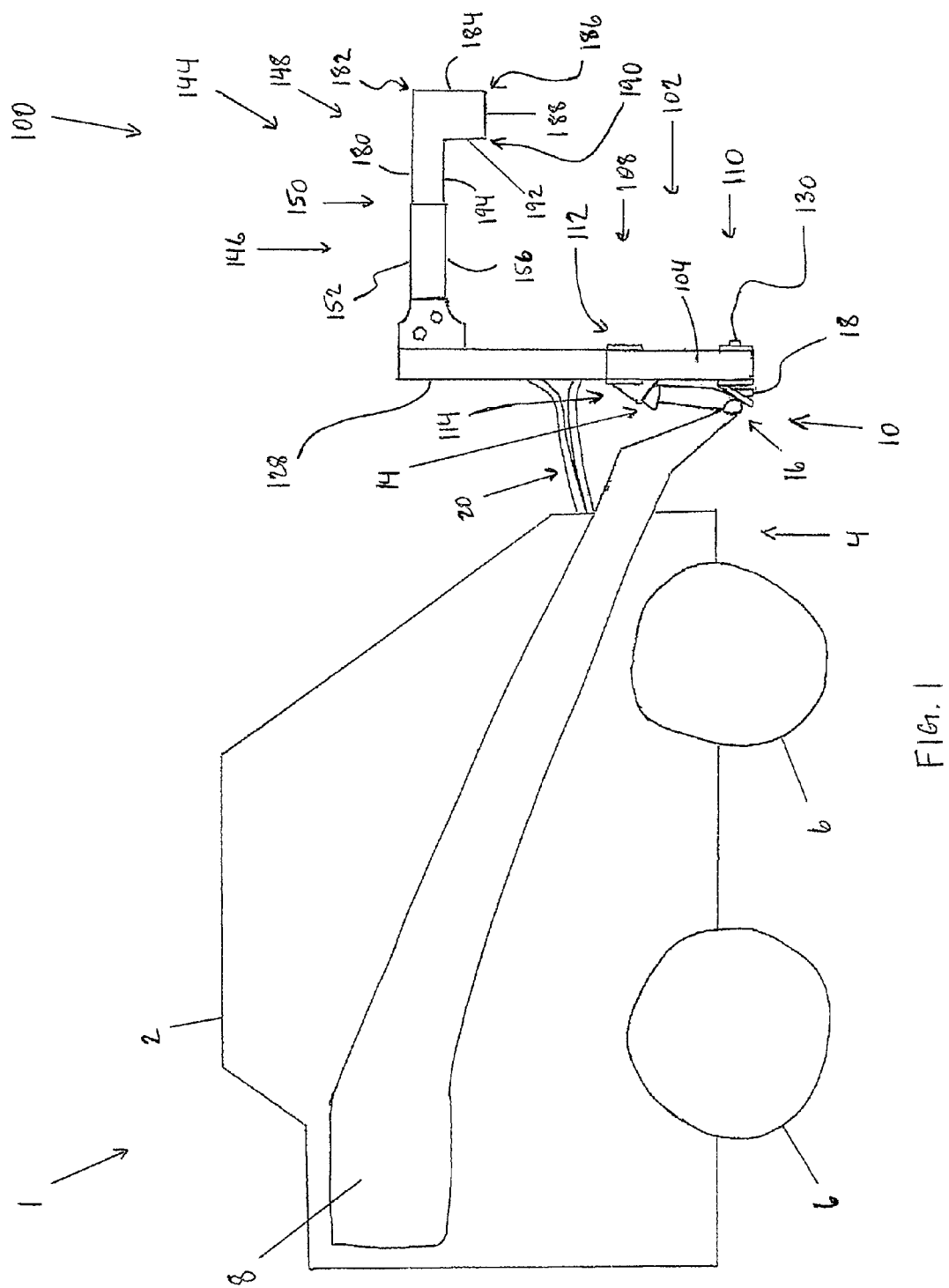
FIG. 1 is a right side elevation view of the skid steer and tree removal device coupled thereon, when the tree removal device is in the neutral position.
Figure 2:
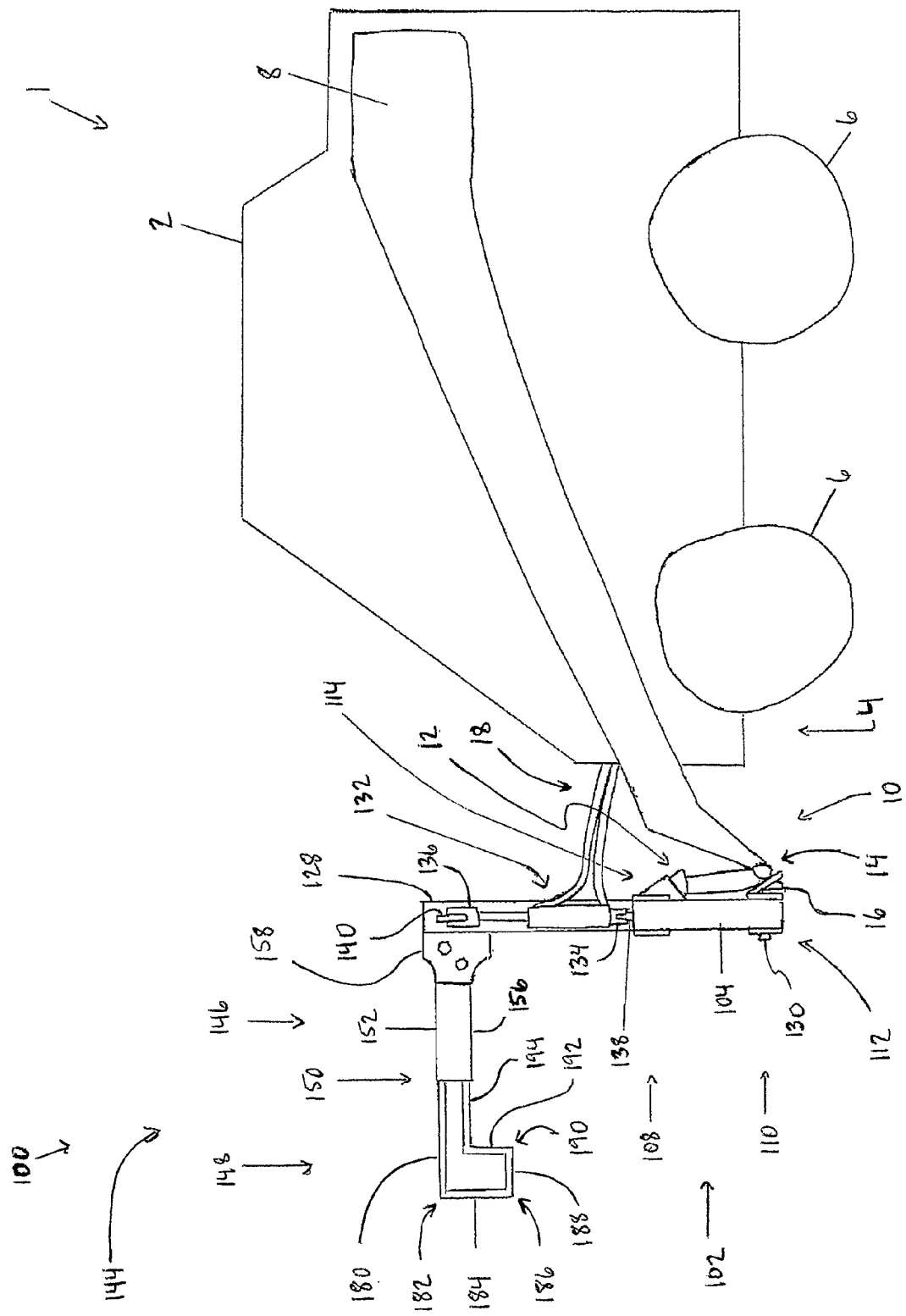
FIG. 2 is a left side elevation view of the skid steer and tree removal device coupled thereon, when the tree removal device is in the neutral position.
Figure 3:
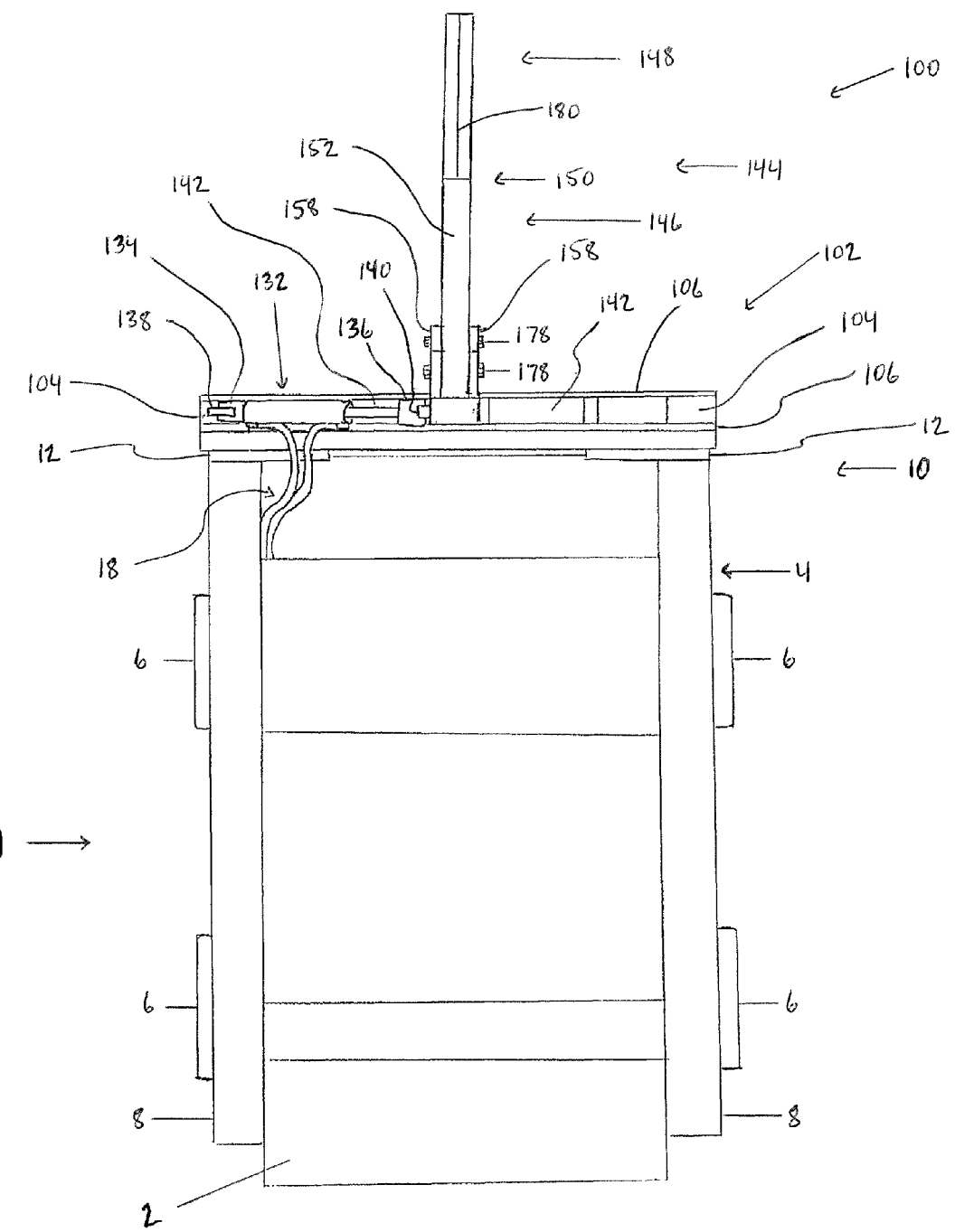
FIG. 3 is a top plan view of the skid steer and tree removal coupled thereon, when the tree removal device is in the neutral position.
Figure 5:
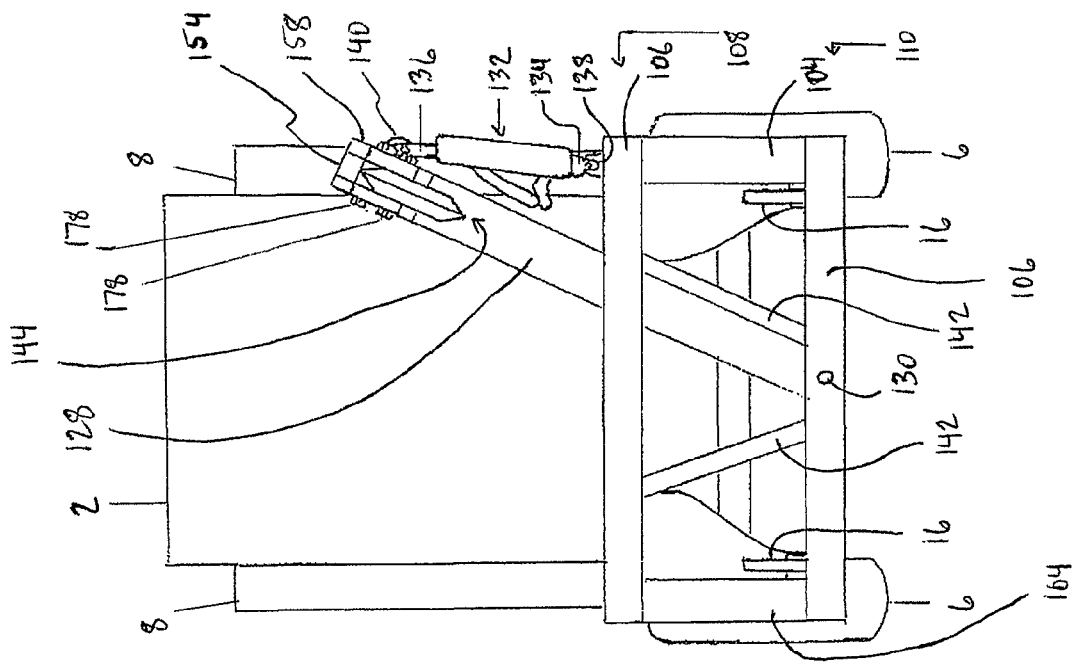
FIG. 5 is a front elevation view of the skid steer and tree removal device coupled thereon, when the tree removal device is in the neutral position, the support post and knife element are tilted in the extreme left position, and the cylinder is in the fully retracted position.
Figure 4:
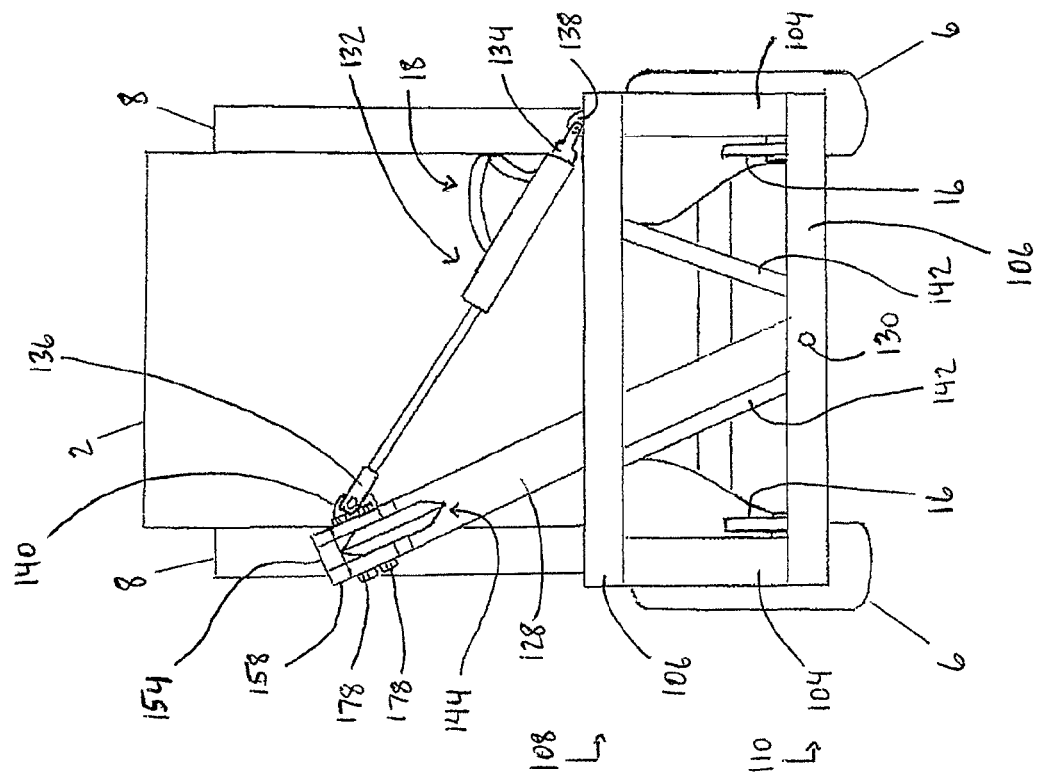
FIG. 4 is a front elevation view of the skid steer and tree removal device coupled thereon, when the tree removal device is in the neutral position, the support post and knife element are tilted in the extreme right position, and the cylinder is in the fully extended position.

Referring to the accompanying figures, there is illustrated a tree removal device generally indicated by reference numeral 100 in FIG. 1. The tree removal device is used in combination with a working vehicle, such as a skid steer 1, to slice tree roots of a tree. The skid steer has a frame 2 with a forward end 4 along a longitudinal axis of the vehicle and laterally opposing traction components 6 coupled to respective lateral sides of the frame and configured to move the vehicle in forward and backward directions. The traction components may be a pair of tracks centered on each lateral side of the frame or four individual wheels, each one of the wheels being positioned at a left-forward portion, right-forward portion, left-rear portion, and right-rear portion of the frame, as in the present embodiment of the skid steer in FIG. 1. Further, the skid steer has two laterally opposed longitudinal loader arms 8 pivotably coupled to a rear end of the frame. The loader arms are arranged for pivotal motion relative to the frame at the forward end of the frame. The working vehicle has a front element 10 pivotably coupled at a forward-most end of the working vehicle such that the front element is able to pivot relative to the skid steer about a lateral axis in front of the forward end of the frame. In the present embodiment of the working vehicle, the front element of the skid steer is a front end adapter that is coupled to forward-most ends of the loader arms.

The preferred embodiment of the tree removal device 100 as in FIGS. 1-6 has an attachment 102 which couples the device in fixed relation to the front end adapter 10. Coupling the attachment fixedly to the front end adapter facilitates the pivotal motion of the tree removal device relative to the skid steer 1 about the lateral axis in front of the forward end 4 of the frame 2. The attachment has two laterally opposed side members 104 that are parallel to one another and which define the lateral ends of the attachment. The side members are aligned at the lateral ends of the attachment so that a laterally-centered vertical plane divides the attachment into symmetrical halves. The side members are spaced apart so that a distance between outermost surfaces of the side members, i.e. the distance between a left side surface of a left side member and a right side surface of a right side member, is slightly larger than the distance between outermost lateral edges of the front end adapter. This spacing of the side members ensures that the attachment fits the front end adapter of the skid steer without being unnecessarily large compared to the width of the front end adapter 10. The side members are coupled together by two pairs of elongate bracing plates 106 that span laterally across the attachment. One pair of the bracing plates is attached at an upper end of the side members so that top edges of the bracing plates are aligned with top edges of the side members at a front and back thereof, and a second pair of same is attached at a lower end of the side members so that bottom edges of the bracing plates are aligned with bottom edges of the side members at the front and back thereof. The pair of bracing plates at the upper end of the side members collectively define the top cross member 108, and the pair of bracing plates at the lower end of the side members collectively define the bottom cross member 110. Further, a first plate of each pair of bracing plates is attached at a front side of the side members so as to generally face in the forward direction of the skid steer; a second plate of each pair is attached at a back side of the side members so as to generally face rearwards, towards the skid steer. Each bracing plate is attached to the side members at right angles. In such a way, the two side members and the four elongated plates collectively comprise an attachment frame 112, which is rectangular in shape.

Figure 6:
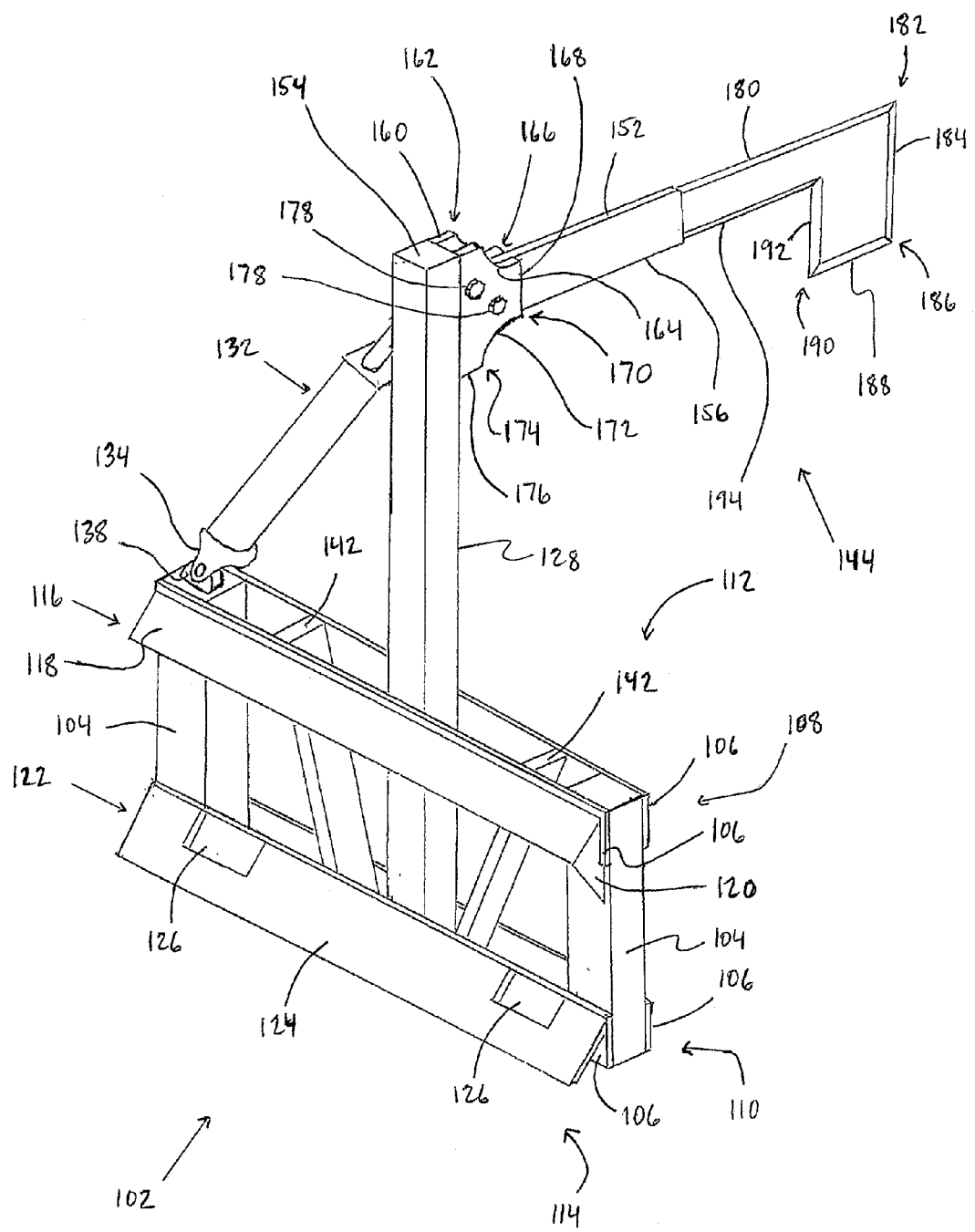
FIG. 6 is a rear perspective view of the tree removal device from the right side thereof.

The attachment 102 also has a coupling portion 114 as better shown in FIG. 6. The coupling portion has an upper receiving element 116 that is coupled at an upper end of the attachment frame 112. The upper receiving element receives a free end 12 of the front end adapter at a top end thereof. The upper receiving element has an upper angled plate 118 that is elongate and spans a full lateral width of the attachment frame between the outermost surfaces of the side members. The upper angled plate is attached at a top edge thereof to the bracing plate 106 at the back side of the upper end of the attachment frame so as to be angled downwards and form an angle sufficiently large to receive the free end of the front end adapter. Two triangular bracket plates 120 are located at lateral ends of the upper angled plate. These bracket plates are attached at the lateral edges of the upper angled plate, between the upper angled plate and the back side of each of the side members. The purpose of the bracket plates is to rigidify the structure of the upper receiving element so as to help in coupling the attachment frame 112 fixedly to the front end adapter 10 when the free end of the front end adapter is received therein.

The coupling portion 114 of the attachment 102 also has a lower receiving element 122 that is coupled at a lower end of the attachment frame 112. The lower receiving element receives a bottom end 14 of the front end adapter 10, where the front end adapter is pivotably coupled to the loader arms. The lower receiving element has a lower angled plate 124 that is elongate and spans the full lateral width of the attachment frame. The lower angled plate is attached at a top edge thereof to the bracing plate 106 at the back side of the lower end of the attachment frame so as to be angled downwards. Two apertures 126 for receiving upright locking pins 16 of the front end adapter are arranged near the top edge of the lower angled plate. The apertures are positioned near the top edge of the lower angled plate with outermost edges of the apertures spaced inward from the outermost surfaces of the side members 104 at a distance that is near the spacing of the locking pins from the outermost lateral edges of the front end adapter so that the apertures are aligned with the locking pins. Insertion of the locking pins 16 into respective apertures 126 secures the coupling portion 114 to the front end adapter 10.

The tree removal device 100 also includes a support post 128. A depth of the support post measured between a front surface of the post facing in the forward direction and a back surface generally facing in the backward direction, towards the skid steer, is near a distance between innermost surfaces of the bracing plates 106 so that the support post is arranged to fit between the two pairs of bracing plates. The support post is pivotably coupled to the attachment frame with a post pivot bearing 130 at a laterally-centered point between the bracing plates at the lower end of the side members so as to extend generally upwards from the attachment frame. The post pivot bearing allows the support post 128 to be adjusted laterally anywhere between an extreme left position and an extreme right position about an axis in a vertical plane containing the longitudinal axis of the working vehicle such that the vertical plane divides the attachment 102 into symmetrical halves.

The pivotal motion of the support post 128 is afforded by a mechanical actuator, which is a tie-rod cylinder 132 in the present embodiment of the invention. The cylinder has a base 134 and opposing head, and a barrel intermediate therebetween coupling the base and the head. A piston is situated inside the barrel and is arranged to be movable along a longitudinal axis of the cylinder between the base and head through the application of differential hydraulic pressure on opposing surfaces at two longitudinal ends of the piston. A piston rod extends from the piston through the head and terminates at an upper coupling portion 136 at a top end thereof. As such, the piston rod is movable along a stroke of the cylinder between a fully extended position, when the piston engages an inner side of the head of the cylinder, and a fully retracted position, when the piston engages an inner side of the base of the cylinder. Hydraulic hoses 18 are used to couple the cylinder to a hydraulic system of the skid steer 1. The hydraulic hoses are connected to the cylinder at two ports: one port at the head and a second port at the base. Controls onboard the skid steer direct flow of hydraulic fluid into two chambers of the cylinder 132 on opposing sides of the piston, generating the differential hydraulic pressure and causing the piston rod to move between the fully extended and fully retracted positions.

The tie-rod cylinder 132 is coupled between the attachment frame 112 and the support post 128, and is pivotable relative to both. The base 134 of the cylinder has two opposing eye holes along lying along an axis that is perpendicular to the longitudinal axis of the cylinder. The eye holes are aligned so that the axis connecting the eye holes is parallel to the longitudinal axis of the skid steer. Furthermore, the left side member of the attachment frame has a flange 138 at a top surface of the left side member. The flange has an eye hole with openings lying along an axis parallel to the vertical plane containing the longitudinal axis of the skid steer. The eye holes of the base of the cylinder and the flange are aligned, and a pivot pin is inserted, thereby coupling the cylinder to the attachment frame. The upper coupling portion 136 of the cylinder is coupled to an upper end of the support post in a similar fashion as the base is to the attachment frame. The upper coupling portion has eye holes which are aligned with an eye hole in a flange 140 protruding from a left side surface of the post so as to lie along an axis that is parallel to the vertical plane containing the longitudinal axis of the vehicle. Then, a pivot pin is inserted through the eyes holes of the upper coupling portion and the flange of the support post.

In conjunction with the lateral adjustment capability of the support post 128, the attachment 102 further includes two support members 142. The support members are set at a fixed angle relative to the side members such that top ends of the support members are positioned closer to innermost surfaces of the side members 104 as compared to bottom ends of the support members. The support members are aligned in between the pairs of bracing plates 106 of the attachment frame 112 such that the attachment still has symmetrical halves on either side of the laterally-centered vertical plane that divides the attachment as such. The purpose of the support members is to support the support post by frictional engagement thereof when the post is in one of the extreme left or the extreme right positions.

The tree removal device further comprises a knife element 144. The knife element has a support portion 146, an opposing blade portion 148, and a transition portion 150 intermediate therebetween where the support portion and blade portion meet. The support portion is elongate and is coupled to the support post 128 such that the knife element extends generally forwards from the post and so that the blade portion is forward of the support portion. With the knife element coupled to the attachment 102 by coupling of the support portion of the knife element to the support post, the knife element is pivotable relative to the frame of the skid steer 1 about the lateral axis in front of the forward end 4 of the frame 2. Additionally, coupling of the support portion to the support post affords a lateral adjustment capability of the support post, referring to the extreme left and right positions thereof, to the knife element as well. The lateral adjustment capability is important to positioning the knife element 144 in close proximity to the tree without contacting same prior to slicing the tree roots thereof, especially when a tree trunk is not vertical. The support portion has a top edge 152, which starts at the front surface of the support post and terminates at the transition portion 150. The top edge of the support portion meets the front surface of the support post at a right angle. Furthermore, this top edge is below a top surface 154 of the support post. In addition to the top edge, the support portion has a bottom edge 156 that is opposite the top edge and below same. The bottom edge starts at the front surface of the support post 128 and terminates at the transition portion 150 of the knife element 144. For the description of the remaining components of the tree removal device 100, consider the device to be in a neutral position unless stated otherwise. In the neutral position, the attachment frame 112 is generally perpendicular to the ground, the support post 128 generally vertical, and the support portion 146 of the knife element 144 is generally parallel to the ground.

Two parallel plates 158 are attached at an upper end of the support post 128, which are arranged to receive the support portion 146 of the knife element 144 and couple the knife element to the support post. The parallel plates are perpendicular to the front surface of the support post, and the plates are spaced apart so that the distance between inner surfaces thereof is approximately equal to the thickness of the support portion of the knife element, which is measured between outer surfaces of the support portion. Each plate 158 has a top edge 160 that is vertically aligned with the top surface 154 of the support post so as to be at the same elevation. The top edge starts at the front surface of the support post—and terminates at a first tip 162 that is forward of the front surface of the support post, at the same elevation as the top surface thereof. Next, an upper beveled edge 164 of each parallel plate starts at the first tip and slopes downwards and forwards therefrom, terminating at a second tip 166 that is below and forward of the first tip, forward of the support post 128, and below the top surface 154 of the support post. The second tip 166 is vertically aligned with the top edge 152 of the support portion 146 so as to be at the same elevation. A front edge 168 of each parallel plate 158 starts at the second tip 166 and extends downwards therefrom and terminates at a third tip 170. The third tip is below the first tip 162, below the second tip 166, forward of the front surface of the support post 128 at a distance that is equal to a distance from the front surface of the support post to the second tip. The third tip 170 is also vertically aligned with the bottom edge 154 of the support portion 146 so as to be at the same elevation. Next, a lower beveled edge 172 starts at the third tip 170 and extends downward and rearward therefrom, and terminates at a fourth tip 174. The fourth tip is below the first tip 162, below the second tip 166, below the third tip 170, rearward of the second tip, and rearward of the third tip. The fourth tip 174 is located at a distance from the front surface of the support post 128 that is equal to a distance of the first tip 162 from the front surface. Lastly, a bottom edge 176 of each parallel plate 158 starts at the fourth tip 174 and extends rearward, terminating at the front surface of the support post 128. The bottom edge is opposite the top edge 160 of each parallel plate and meets the front surface of the support post at a right angle. Further to the parallel plates are two attachment bolts 178 that are perpendicular to the parallel plates and are threaded through same. A first one of the attachment bolts is below the second tip 166 of the parallel plates 158, rearward of the first tip 162 and fourth tip 174, and above the third tip 170. A second one of the attachment bolts is below the second tip 166, above the third tip 170, forward of the first tip 162 and fourth tip 174, and rearward of the second tip and third tip. Further, the second attachment bolt is forward of and below the first attachment bolt. The attachment bolts 178 serve to clamp the parallel plates 158 to the support portion, so as to hold the knife element 144 in fixed relation to the support post 128 through frictional engagement of the outer surfaces of the support portion 146. Use of the parallel plates and attachment bolts to couple the knife element to the support post affords exchangeability of the knife element to a replacement knife element of the same type as that illustrated in FIGS. 1-6 or to a differently shaped knife element whose structure does not depart from the scope and spirit of the present invention.

Returning to the knife element 144, the blade portion 148 of the knife element is generally L-shaped with a free end protruding downwards. The blade portion has a top edge 180 that starts at the transition portion 150, meeting the top edge 152 of the support portion 146, and terminates at a forward-most tip 182. The top edge of the blade portion is slightly below the top edge of the support portion, below the top surface 156 of the support post 128, and below the top edge 160 of each of the parallel plates 158 in the neutral position. In addition, the forward-most tip is forward of the transition portion, forward of the support post, above the top cross member 108 of the attachment frame 112, yet below the top surface of the support post in the neutral position. Next, a front edge 184 of the blade portion extends downward from the forward-most tip 182, at a right angle to the top edge 180 of the blade portion, and terminates at a bottom tip 186. Both the top edge and the front edge of the blade portion are arranged for engaging the ground in the forward direction of movement of the skid steer 1, when the blade portion 148 is pivotally rotated for engaging the ground. As such, the top and front edges are sharpened so as to perform a cutting action in the forward direction of movement. A bottommost edge 188 starts at the bottom tip and extends rearward therefrom, terminating at a rear tip 190. The bottommost edge meets the front edge 184 at a right angle. The rear tip is rearward of the forward-most tip 182 and the bottom tip 186, below the forward-most tip, forward of the transition portion 150 of the knife element 144, and above the top cross member 108 of the attachment frame 112. The combination of the bottommost edge 188, front edge 184, and the bottom tip 186 are arranged for engaging the ground in both the forward and backward directions of movement of the skid steer 1, when the blade portion 148 is pivotally rotated to engage the ground. As such, the bottommost edge is sharpened in addition to the front edge so as to perform a digging action in both directions of movement of the skid steer. A rear edge 192 starts at the rear tip 190, extending upwards therefrom and terminating at a top end of the rear edge. The rear edge and bottommost edge form a right angle at the rear tip. The top end of the rear edge is above the bottom tip 186, above the bottommost edge 188, below the top edge 180 of the blade portion, and rearward of the forward-most tip 182. Both the rear edge and the bottommost edge are arranged for engaging the ground in the backward direction of movement of the skid steer, when the blade portion is pivotally rotated for engaging the ground. As such, the rear edge is sharpened in addition to the bottommost edge so as to perform a cutting action in the backward direction of movement. Finally, a bottom edge 194 of the blade portion 148 starts at the top end of the rear edge 192 and extends rearward therefrom and ends at the transition portion 150 of the knife element 144, meeting the bottom edge 154 of the support portion 146. The bottom edge 194 of the blade portion meets the rear edge thereof at a right angle. Further, the bottom edge is opposite the top edge 180 of the blade portion, above the bottommost edge 188 thereof, and slightly above the bottom edge of the support portion. The bottom edge is arranged for engaging the ground in the backward direction of movement of the skid steer 1, when the blade portion 148 is pivotally rotated for engaging the ground. As such, the bottom edge 194 is also sharpened to perform the backward cutting action in conjunction with the rear edge 192 and bottommost edge 188.

It is possible to have the knife element 144 coupled directly to the attachment 102 via direct coupling to the attachment frame 112 in lieu of using the support post 128. As such, the purpose of the support post is to elevate the knife element so that the bottom tip 186 is above the top cross member 108 of the attachment frame and consequently viewable by an operator sitting in a cabin within the frame 2 of the skid steer 1. For the same reason of visibility, it is crucial that the width of the support post, defined by the distance between the left side surface and a right side surface of the support post, is proximate the sum of the thicknesses of the two parallel plates 158 and the thickness of the support portion 146 of the knife element 144 so that the knife element is viewable from around the support post, from the left or right side thereof. In addition to providing visibility, elevating the knife element through use of a support post extends the forward reach of the knife element when the knife element is pivotally rotated to engage the ground so that the distance from the bottom tip 186, when pivotally rotated to engage the ground, to the top cross member 108 is larger than same if the knife element were directly coupled to the attachment 102. The larger forward reach of the bottom tip allows the skid steer 1 to be manoeuvered closer to the tree trunk when performing a cutting action.

In use, the tree removal device 100 must first be attached to the skid steer 1. Attachment of the device to the skid steer is accomplished by driving the skid steer towards the tree removal device and positioning the front end adapter 10 so as to insert the free end 12 thereof into the upper receiving element 116 of the coupling portion 114 of the attachment 102. Once the free end of the front end adapter has been inserted into the upper receiving element, the front end adapter is lifted upwards so as to lift the tree removal device 100 off of the ground. Furthermore, the front end adapter is pivotally adjusted so as to bring the device to the neutral position. Bringing the device to the neutral position ensures that the bottom end 14 of the front end adapter aligns with the lower receiving element of the coupling portion. Once the bottom end 14 of the front end adapter overlaps the lower receiving element 122, the operator of the skid steer 1 should push the tree removal device down by pulling the blade portion 148 of the knife element 144 downwards so as to insert the free end 12 of the front end adapter 10 fully into the upper receiving element 116. Next, the locking pins 16 of the front end adapter are pushed downwards so as to be inserted into the apertures of the lower receiving element, securing the attachment to the front end adapter. Furthermore, the hydraulic hoses 18 of the skid steer are connected to the base 134 and head of the cylinder 132 to provide hydraulic power to the cylinder.

With the tree removal device 100 mounted to the skid steer 1, the combination of the two is ready for slicing tree roots. The skid steer is manoeuvered so as to position the knife element to one side of the tree in a first cutting position, so that when the knife element 144 is pivotally rotated to engage the ground, the bottom tip 186 of the blade portion 148 is proximate a center of the respective side of the tree. The knife element may be laterally pivoted from the neutral position using the cylinder 132 to any lateral position between the extreme left position and the extreme right position as needed, so as to bring the knife element closer to the tree trunk without engaging same. Positioning the knife element in close proximity to the tree trunk, as judged by the operator of the skid steer who is skilled in the art of transplanting trees, is necessary to be able to slice as many tree roots as possible on each side of the tree. Then, the knife element is pivotally rotated so as to insert a forward-most portion of the blade portion into the ground, which includes the bottom tip, the bottommost edge 188, and the front edge 184. It is important to realize that the ease of insertion of the forward-most portion will depend on the toughness of the soil. With as much of the blade portion 148 inserted into the ground as possible, the skid steer 1 is moved backwards in a straight line whereby a cutting action is performed in the same direction. The skid steer is moved backwards so far as is deemed necessary to slice the tree roots on that side of the tree, which will be determined by the operator. A mark left in the ground where the cutting action was performed is called a cutting line. After, the skid steer is moved forwards to perform a cutting action in the forward direction along the same cutting line as the previous cutting action. The skid steer is moved forwards so far as the cylinder 132 or top cross member 108 do not contact the tree trunk. The aggregation of one cutting action in the forward direction and one cutting action in the backward direction on a single side of a tree is called a pass. Depending on the perceived depth of the tree roots, which is judged by the operator based on tree type, additional passes may be needed in order to slice the roots to an appropriate depth. The blade portion 148 is pivotally rotated deeper into the ground on each subsequent pass to achieve cutting at greater depths. Alternatively, the blade portion can be pivoted deeper into the ground after a single cutting action in one direction. Gradually pivoting the blade portion downwards after each cutting action might require fewer passes to fully slice the roots on each side of the tree. Furthermore, the front end adapter 10 may be elevated upwards when the blade portion is engaging the ground, in addition to pivoting the blade portion downward, to afford a substantially deeper cut than by pivoting of the blade portion alone. Regardless of the number of passes that are required to fully slice the roots, it is important perform each subsequent cutting action along the same cutting line so as to slice the tree roots at a single point along the root. In this manner, the tree roots are less likely to become damaged as a result of the cutting action and the root ball will be preserved, which is important when the tree will be transplanted. Once the roots are fully sliced on the one side of the tree, the skid steer is manoeuvered to reposition the knife element 144 on the opposite side of the tree in a second cutting position so that rectilinear cutting actions in this second cutting position are approximately parallel to the cutting line from the first cutting position. The same process of inserting the blade portion 148 into the ground, following by forward and backward movements of the skid steer 1, and gradual pivoting of the blade portion deeper into the ground is followed to fully slice the tree roots on the side of the tree corresponding to the second cutting position. After all slicing is completed in the second position, the skid steer is manoeuvered into a third cutting position on another side of the tree so that the resulting rectilinear cutting actions in the third position are substantially at right angles to the cutting lines of the first and second positions. The cutting actions performed in the third position should intersect regions of the cutting actions performed in the first and second positions. As such, the cutting process is repeated, after which the skid steer is manoeuvered into a fourth cutting position whose corresponding rectilinear cutting actions will be substantially parallel to same in the third position. If any one of the cutting lines do not intersect after performing passes along the first four cutting positions, the skid steer 1 must be manoeuvered into a new position, from which the cutting process can be repeated along any one of the previous cutting lines of the four cutting positions so as to fully slice all tree roots by intersecting the remaining cutting lines with subsequent cutting actions.

Since various modifications can be made in my invention as herein above described, and many apparently widely different embodiments of same made, it is intended that all matter contained in the accompanying specification shall be interpreted as illustrative only and not in a limiting sense.

The invention claimed is:
1. A combination of a skid steer and a tree removal device configured for coupling thereon such that the combination is arranged for slicing tree roots, the combination comprising:
  the skid steer having:
    a frame with a forward end along a longitudinal axis of the skid steer;
    traction components at lateral sides of the frame that are configured to move the skid steer across a support surface;
    working arms extending longitudinally of the frame on either side thereof that are pivotally mounted at or adjacent a rear end of the frame with free ends located at or adjacent the forward end of the frame;
    a front element pivotally carried on the working arms at or adjacent the free ends thereof such that the front element is pivotally movable relative to the frame about a lateral axis spaced from the frame;

the tree removal device including:
an attachment portion including:
a planar base frame coupled to the front element of the skid steer in fixed relation thereto such that the base frame is oriented laterally to the skid steer; and
a support member projecting outwardly from said base frame away from the front element of the skid steer;
a knife element carried on the support member at a location thereon that is spaced from the base frame of the tree removal device;
the knife element projecting forwardly from the support member such that a blade portion at or adjacent a free end of the knife element that is usable for slicing the tree roots is held at a position spaced forward of the skid steer frame;
the blade portion having planar faces on either side facing generally in a laterally horizontal direction;
the blade portion having a perimeter edge joining the planar faces about their periphery at the free end of the knife element such that the planar faces are contiguous at the perimeter edge with at least a portion of said perimeter edge being sharpened so as to perform a cutting action on the tree roots when the skid steer is operated including being moved in forward and backward directions across the support surface.

2. The combination according to claim 1, wherein the base frame comprises opposite top and bottom cross members and two laterally opposite side members spanning between the top and bottom cross members with the support member extending from the bottom cross member upwardly beyond the top cross member in a plane of the base frame.

3. The combination according to claim 1 wherein the knife element is supported in fixed position relative to the support member.

4. The combination according to claim 1 wherein the support member is supported in fixed position to the base fame relative to the lateral axis such that the support member is movable in fixed relation with the base frame about the lateral axis.

5. The combination according to claim 1 wherein the knife element is supported on the support member at a receptacle receiving the knife element therein such that knife elements having different shapes of blade portions are interchangeable on the support member.

6. The combination according to claim 5 wherein the knife element is held in butting engagement with a closed bottom of the receptacle.

7. The combination according to claim 1 wherein the perimeter edge is sharpened along its length so as to be arranged for slicing the tree roots in a plurality of orientations of the blade portion.

8. The combination according to claim 1 wherein the perimeter edge is smooth so as to be free of serrations.

9. The combination according to claim 1 wherein the blade portion of the knife element lies in a flat upstanding plane.

10. A combination of a tree removal device and a working vehicle configured for coupling the tree removal device thereon such that the combination is arranged for slicing tree roots, the combination comprising:
a working vehicle having a frame with a forward end along a longitudinal axis of the vehicle, laterally opposing traction components coupled to respective lateral sides of the frame and configured to move the vehicle in forward and backward directions, and a front element pivotably coupled at a forward-most end of the working vehicle such that the front element is arranged for pivotal motion relative to the working vehicle about a lateral axis in front of the forward end of the frame,
an attachment configured for coupling in fixed relation to the front element,
a knife element having opposite blade and support portions, the support portion being coupled to the attachment such that the knife element extends generally forwards from the attachment and is arranged to be pivotable relative to the frame of the working vehicle about the lateral axis in front of the forward end of the frame, and the blade portion comprising at least one edge that is arranged to engage the ground in a respective at least one direction of movement of the working vehicle,
a mechanical actuator arranged for coupling between the knife element and the attachment,
wherein said at least one edge is sharpened so as to perform a cutting action in said at least one direction of movement,
wherein the knife element is arranged for pivotal motion relative to the attachment about an axis in a vertical plane containing the longitudinal axis of the working vehicle such that the vertical plane divides the working vehicle into symmetrical halves, the knife element being pivotable between an extreme left position and an extreme right position,
wherein the mechanical actuator is arranged to provide the pivotal motion of the knife element between said extreme left position and said extreme right position.

11. The combination according to claim 10, wherein the at least one edge of the blade portion is a front edge arranged for engaging the ground in the forward direction of movement of the working vehicle, the front edge being sharpened so as to perform the cutting action in the forward direction of movement of the working vehicle.

12. The combination according to claim 11, wherein the blade portion of the knife element further comprises a top edge arranged for engaging the ground in the forward direction of movement of the working vehicle such that the top edge meets the front edge at an upper end thereof so as to form a front tip at a forward-most end of the blade portion of the knife element when the blade portion is pivotally rotated for engaging the ground, the top edge being sharpened so as to perform the cutting action in conjunction with the front edge in said forward direction of movement.

13. The combination according to claim 10, wherein the at least one edge of the blade portion is a rear edge arranged for engaging the ground in the backward direction of movement of the working vehicle, the rear edge being sharpened so as to perform the cutting action in the backward direction of movement of the working vehicle.

14. The combination according to claim 13, wherein the blade portion of the knife element further comprises a bottommost edge arranged for engaging the ground in the backward direction of movement of the working vehicle such that the bottommost edge meets the rear edge at a lower end of the rear edge so as to form a rear tip at a rearward-most end of the blade portion of the knife element when the blade portion is pivotally rotated for engaging the ground, the bottommost edge being sharpened so as to perform the cutting action in conjunction with the rear edge in said backward direction of movement.

15. The combination according to claim 14, wherein the blade portion of the knife element further comprises a front edge arranged for engaging the ground in the forward direction of movement of the working vehicle, and the bottommost edge meets the front edge at a lower end thereof so as to form a bottom tip at a downward-most end of the blade portion of the knife element when the blade portion is pivotally rotated for engaging the ground such that the bottom tip is arranged for digging the ground in both the forward and backward directions of movement of the working vehicle.

16. The combination according to claim 10, wherein the combination further comprises a support post arranged for coupling the support portion of the knife element to the attachment, the support post being arranged for pivotal motion about the longitudinal axis of the working vehicle relative to the attachment about the axis in the vertical plane containing the longitudinal axis of the working vehicle such that the vertical plane divides the working vehicle into symmetrical halves, the support post being pivotable between the extreme left position and the extreme right position in conjunction with the knife element when the support portion of the knife element is coupled in fixed relation to the support post, and wherein the attachment comprises an attachment frame having opposite top and bottom cross members and two laterally opposed side members spanning between the top and bottom cross members, the support post being coupled to the attachment frame so that the support post extends in a general upward direction from the bottom cross member.

17. The combination according to claim 16, wherein the support post comprises a pair of plates spaced laterally about a center axis of the support post arranged for coupling the support portion of the knife element therein.

18. A method of slicing roots of a tree in the ground in a manner such that the tree is transplantable comprising:
  providing a working vehicle including:
    a frame with a forward end along a longitudinal axis of the vehicle;
    traction components at lateral sides of the frame configured for moving the vehicle in forward and backward directions; and
    a front element at a forward-most end of the vehicle that is pivotally movable relative to the frame about a lateral axis spaced from the frame;
  providing a tree removal device which is configured for coupling to the front element of the working vehicle including:
    an attachment portion configured for coupling to the front element of the working vehicle in fixed relation thereto;
    a knife element carried on the attachment portion so as to project forwardly such that a blade portion at a free end of the knife element carrying a cutting edge for slicing the tree roots is held at a position forward of the frame of the working vehicle;
    the knife element being carried so as to lie in a flat upstanding plane;
  with the tree removal device coupled to the working vehicle:
    a) engaging the ground on one side of the tree with the blade portion of the tree removal device by pivoting the knife element into the ground using the front element of the working vehicle;
    b) moving the frame of the working vehicle using its traction components in at least one of the forward and backward directions so as to perform a cutting action with the cutting edge in the respective direction of movement for slicing the tree roots disposed on said side of the tree thereby forming a pass on said side of the tree;
    c) repositioning the working vehicle to another side of the tree for repeating steps a) and b) so as to form a plurality of the passes about the tree to completely slice the tree roots such that the tree is removable from the ground in a condition where the tree is transplantable.

19. The method according to claim 18 wherein each pass comprises a plurality of cutting actions including progressively inserting the blade portion deeper into the ground.

20. The method according to claim 18 wherein the working vehicle is a skid steer.

* * * * *